United States Patent
Piparsaniya et al.

(10) Patent No.: US 11,790,373 B2
(45) Date of Patent: *Oct. 17, 2023

(54) ELECTRONIC SYSTEM AND COMPUTERIZED METHOD FOR PROCESSING RECURRING PAYMENT TRANSACTIONS

(71) Applicant: Mastercard International Incorporated, Purchase, NY (US)

(72) Inventors: Harsh Piparsaniya, Pune (IN); Sudhir Gupta, Pune (IN); Rahul Agrawal, Pune (IN)

(73) Assignee: Mastercard International Incorporated, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/844,511

(22) Filed: Jun. 20, 2022

(65) Prior Publication Data
US 2022/0327539 A1 Oct. 13, 2022

Related U.S. Application Data

(63) Continuation of application No. 16/416,475, filed on May 20, 2019, now Pat. No. 11,392,956.

(30) Foreign Application Priority Data

Jun. 21, 2018 (SG) .............................. 10201805351S

(51) Int. Cl.
*G06Q 40/00* (2023.01)
*G06Q 20/40* (2012.01)
(Continued)

(52) U.S. Cl.
CPC ........... *G06Q 20/405* (2013.01); *G06Q 20/22* (2013.01); *G06Q 20/351* (2013.01)

(58) Field of Classification Search
CPC .... G06Q 20/405; G06Q 20/22; G06Q 20/351; G06Q 20/385; G06Q 20/14
(Continued)

(56) References Cited

U.S. PATENT DOCUMENTS 10,915,899 B2 * 2/2021 Lopez ................ G06Q 30/0185
11,188,887 B1 * 11/2021 Limaye ................ G06Q 20/385
(Continued)

OTHER PUBLICATIONS

An analysis and comparison of different types of electronic payment systems; PICMET '01. Portland International Conference on Management of Engineering and Technology; (Volume: Supplement, pp. 38-45 vol. 2); Zon-Yau Lee, Hsiao-Cheng Yu, Pei-Jen Ku, Jul. 29, 2001. (Year: 2001).*

(Continued)

*Primary Examiner* — Tien C Nguyen
(74) *Attorney, Agent, or Firm* — Hovey Williams LLP

(57) ABSTRACT

The present disclosure generally relates to systems and methods for processing recurring payment transactions. In various embodiments, the system receives details of the set of recurring payment transactions and stores the details in a recurring transaction details table. The system generates a virtual payment instrument and associates it with the consumer's payment instrument. The system transmits the virtual payment instrument to the consumer. The system then generates a set of payment tokens for the set of recurring transactions and links the tokens to the virtual payment instrument. Each token is associated with a discrete recurring period. The system encodes each token with a sequence of values and stores the tokens in the recurring payment token table. The system receives a recurring transaction request that includes the virtual payment instrument. The system validates the request against a token associated with the recurring period, processes the transaction, and deletes the token.

20 Claims, 7 Drawing Sheets

(51) Int. Cl.
*G06Q 20/22* (2012.01)
*G06Q 20/34* (2012.01)

(58) Field of Classification Search
USPC ............... 705/35, 39, 40, 26, 37, 38; 726/2; 709/201; 235/375, 380
See application file for complete search history.

(56) References Cited

U.S. PATENT DOCUMENTS

| | | | |
|---|---|---|---|
| 2002/0147685 A1* | 10/2002 | Kwan | G06Q 20/385 |
| | | | 705/40 |
| 2015/0026062 A1* | 1/2015 | Paulsen | G06Q 20/29 |
| | | | 705/44 |
| 2016/0267467 A1* | 9/2016 | Rutherford | H04L 9/3228 |
| 2016/0275512 A1* | 9/2016 | Bondesen | G06Q 20/385 |
| 2016/0342962 A1* | 11/2016 | Brown | G06Q 20/385 |
| 2017/0132633 A1* | 5/2017 | Whitehouse | H04L 63/08 |
| 2017/0221066 A1* | 8/2017 | Ledford | G06Q 20/4016 |
| 2017/0228723 A1* | 8/2017 | Taylor | H04L 63/123 |
| 2017/0364880 A1* | 12/2017 | Malhotra | G06Q 20/027 |
| 2018/0232720 A1* | 8/2018 | Robeen | G06Q 20/351 |
| 2019/0197501 A1* | 6/2019 | Senci | G06Q 20/3223 |

OTHER PUBLICATIONS

Research on E-Payment Model; 2010 International Conference on E-Business and E-Government (pp. 339-341); May 7, 2010; Zhu Junxuan. (Year: 2010).*

* cited by examiner

| Recurring Payment Transactions Details | |
|---|---|
| Start Date | 1 January 2018 |
| End Date | 31 December 2018 |
| Recurring Period Duration | 1 month |
| Number of Recurring Periods | 12 |
| Common Date | 15 |
| Common Maximum Payment Amount | $100 |

Figure 3B

| Detail | Real Payment Instrument | Virtual Payment Instrument |
|---|---|---|
| Identifier | 5432 8888 8888 1234 | 5403 9999 9999 3456 |
| Security Code | 5678 | 2233 |
| Expiry Date | December 2020 | 31 December 2018 |

Figure 3C

| Recurring Period | Payment Token (Example: A A A A B B B B C C D D D) |
|---|---|
| January 2018 | 3 4 5 6 0 1 1 8 1 5 1 0 0 |
| February 2018 | 3 4 5 6 0 2 1 8 1 5 1 0 0 |
| March 2018 | 3 4 5 6 0 3 1 8 1 5 1 0 0 |
| April 2018 | 3 4 5 6 0 4 1 8 1 5 1 0 0 |
| May 2018 | 3 4 5 6 0 5 1 8 1 5 1 0 0 |
| June 2018 | 3 4 5 6 0 6 1 8 1 5 1 0 0 |
| July 2018 | 3 4 5 6 0 7 1 8 1 5 1 0 0 |
| August 2018 | 3 4 5 6 0 8 1 8 1 5 1 0 0 |
| September 2018 | 3 4 5 6 0 9 1 8 1 5 1 0 0 |
| October 2018 | 3 4 5 6 1 0 1 8 1 5 1 0 0 |
| November 2018 | 3 4 5 6 1 1 1 8 1 5 1 0 0 |
| December 2018 | 3 4 5 6 1 2 1 8 1 5 1 0 0 |

- Last 4 digits of Virtual Payment Instrument Identifier
- Recurring Period
- Common Maximum Payment Amount
- Common Date

Figure 3D

ELECTRONIC SYSTEM AND COMPUTERIZED METHOD FOR PROCESSING RECURRING PAYMENT TRANSACTIONS

CROSS REFERENCE TO RELATED APPLICATIONS

This application is a continuation of U.S. patent application Ser. No. 16/416,475, filed May 20, 2019, and titled ELECTRONIC SYSTEM AND COMPUTERIZED METHOD FOR PROCESSING RECURRING PAYMENT TRANSACTIONS, which, itself claims priority to Singaporean Application Serial No. 10201805351S, filed Jun. 21, 2018. Each of the listed earlier-filed applications are incorporated herein by reference in their entireties.

TECHNICAL FIELD

The present disclosure generally relates to an electronic system and computerized method for processing recurring payment transactions. Particularly, the present disclosure describes various embodiments of an electronic system and computerized method for processing payment transactions between a consumer and a merchant, the payment transactions recurring over a series of recurring periods.

BACKGROUND

Various types of transactions between a merchant and a consumer occur on a recurring basis. For example, a consumer may subscribe to merchant services such as Netflix, and the subscription may be contractual, i.e. with a predefined contract period. Periodic or recurring payments, e.g. monthly or annually, are made by the consumer to the merchant during the subscription period or until the subscription is terminated. Recurring payments to merchants for subscription services are usually paid with a credit card of a consumer. Some merchants may offer free trials of their services to attract new consumers to subscribe to them. The consumer would be required to provide their credit card details and the merchant may trigger payment of the subscription service after the free trial period has ended. The merchant is in possession of the consumer's credit card details and such details may be compromised during or after the subscription period. Particularly, the merchant may abuse the credit card details and continue to process payments form the credit card even after the subscription period has ended.

Korea patent publication 20140092631 describes an automatic payment method for recurring billing using a virtual credit card. The virtual credit card is used to pay a merchant for the recurring bill payments instead of using a real credit card, which may offer some protection to the sensitive information in the real credit card. However, the virtual credit card may still be compromised and abused by the merchant after the subscription period or after termination of the recurring billing.

Therefore, in order to address or alleviate at least one of the aforementioned problems and/or disadvantages, there is a need to provide an improved electronic system and computerized method for processing recurring payment transactions.

SUMMARY

According to a first aspect of the present disclosure, there is a payment network server, a computerized method, and a non-transitory computer-readable storage medium comprising instructions for processing payment transactions between a consumer and a merchant, the payment transactions recurring over a series of recurring periods. The payment network server comprises a transaction module, a token management module, and an authorization module configured for performing steps of the method.

The transaction module is configured for: receiving a request from the merchant for an instant payment transaction during an instant recurring period, the instant payment transaction request comprising details of a virtual payment instrument of the consumer and a payment amount for the instant recurring period.

The token management module is configured for: identifying, from a payment network database, a set of payment tokens based on the virtual payment instrument details, the set of payment tokens being commonly associated with the virtual payment instrument and each payment token being uniquely associated with one of the recurring periods; validating the instant payment transaction request against an instant payment token from the set of payment tokens, the instant payment token associated with the instant recurring period; and retrieving, from the payment network database in response to successful validation, details of a real payment instrument of the consumer linked to the virtual payment instrument.

The authorization module is configured for: communicating, to an issuer server for the real payment instrument, a request for authorization of the instant payment transaction, the authorization request comprising the real payment instrument details and the payment amount. The payment amount is transferred from the real payment instrument to an account of the merchant in response to authorization of the instant payment transaction.

According to a second aspect of the present disclosure, there is a payment network server, a computerized method, and a non-transitory computer-readable storage medium comprising instructions for processing payment transactions between a consumer and a merchant, the payment transactions recurring over a series of recurring periods. The payment network server comprises a consumer registration module and a token management module configured for performing steps of the method.

The consumer registration module is configured for: receiving, from an electronic device of the consumer, details of a real payment instrument of the consumer and details of the recurring payment transactions with the merchant; generating a virtual payment instrument and details thereof based on the real payment instrument details, the virtual payment instrument linked to the real payment instrument; and communicating the virtual payment instrument details to the consumer electronic device.

The token management module is configured for: generating a set of payment tokens based on the recurring payment transactions details, the set of payment tokens being commonly associated with the virtual payment instrument and each payment token being uniquely associated with one of the recurring periods. Requests for the recurring payment transactions by the merchant are validated against the set of payment tokens for processing the recurring payment transactions.

An electronic system and computerized method for processing recurring payment transactions according to the present disclosure are thus disclosed herein. Various features, aspects, and advantages of the present disclosure will become more apparent from the following detailed description of the embodiments of the present disclosure, by way of

BRIEF DESCRIPTION OF THE DRAWINGS

FIG. 3B is a table exemplifying details of the recurring payment transactions, in accordance with embodiments of the present disclosure.

FIG. 3C is a table exemplifying details of real and virtual payment instruments, in accordance with embodiments of the present disclosure.

FIG. 3D is a table exemplifying details of payment tokens, in accordance with embodiments of the present disclosure.

DETAILED DESCRIPTION

In the present disclosure, depiction of a given element or consideration or use of a particular element number in a particular figure or a reference thereto in corresponding descriptive material can encompass the same, an equivalent, or an analogous element or element number identified in another figure or descriptive material associated therewith. The use of "/" in a figure or associated text is understood to mean "and/or" unless otherwise indicated. For purposes of brevity and clarity, descriptions of embodiments of the present disclosure are directed to an electronic system and computerized method for processing recurring payment transactions, in accordance with the drawings. While aspects of the present disclosure will be described in conjunction with the embodiments provided herein, it will be understood that they are not intended to limit the present disclosure to these embodiments. On the contrary, the present disclosure is intended to cover alternatives, modifications and equivalents to the embodiments described herein, which are included within the scope of the present disclosure as defined by the appended claims. Furthermore, in the following detailed description, specific details are set forth in order to provide a thorough understanding of the present disclosure. However, it will be recognized by an individual having ordinary skill in the art, i.e. a skilled person, that the present disclosure may be practiced without specific details, and/or with multiple details arising from combinations of aspects of particular embodiments. In a number of instances, known systems, methods, procedures, and components have not been described in detail so as to not unnecessarily obscure aspects of the embodiments of the present disclosure.

Overview

Figure 1:
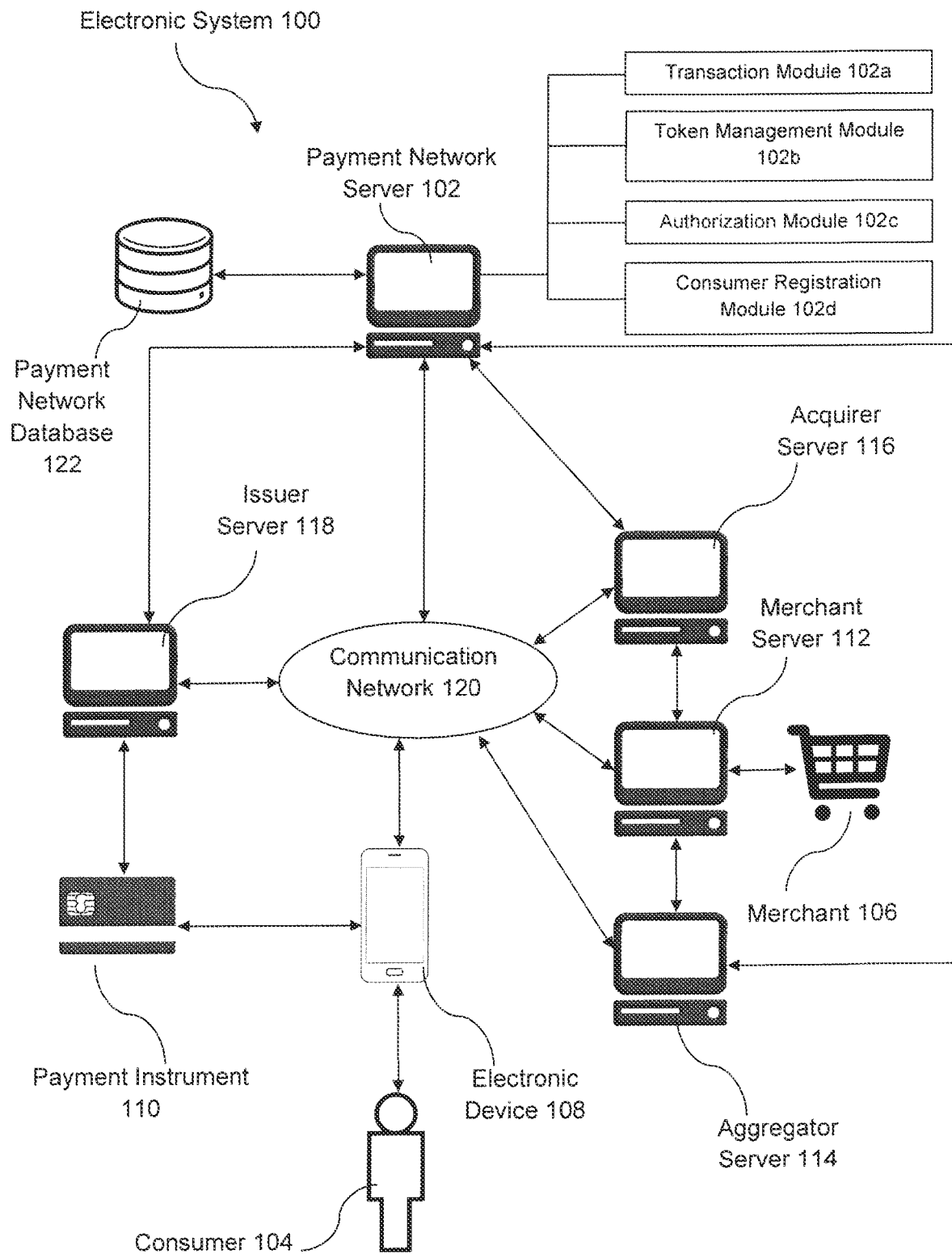
FIG. 1 is an illustration of an electronic system for processing recurring payment transactions, in accordance with embodiments of the present disclosure.

In representative or exemplary embodiments of the present disclosure, there is an electronic or computer system 100 including a payment network server 102 for processing payment transactions between a consumer 104 and a merchant 106, as illustrated in FIG. 1. The payment transactions are recurring transactions over a series of recurring periods. For example, the payment transactions relate to a subscription service provided by the merchant 106 and to which the consumer 104 has subscribed, and the payment transactions recur periodically during the subscription period. A payment transaction is performed during each recurring period, such as monthly, quarterly, half-yearly, or annually. The system 100 includes an electronic device 108 and a payment instrument 110 belonging to the consumer 104. The system 100 further includes a server 112 of the merchant 106, an aggregator server 114 for the merchant 106, an acquirer server 116 for the merchant 106, and an issuer server 118 for the consumer payment instrument 110. The payment network server 102, consumer electronic device 108, merchant server 112, aggregator server 114, acquirer server 116, and issuer server 118 are communicable with one another through a communication network 120.

Figure 2:
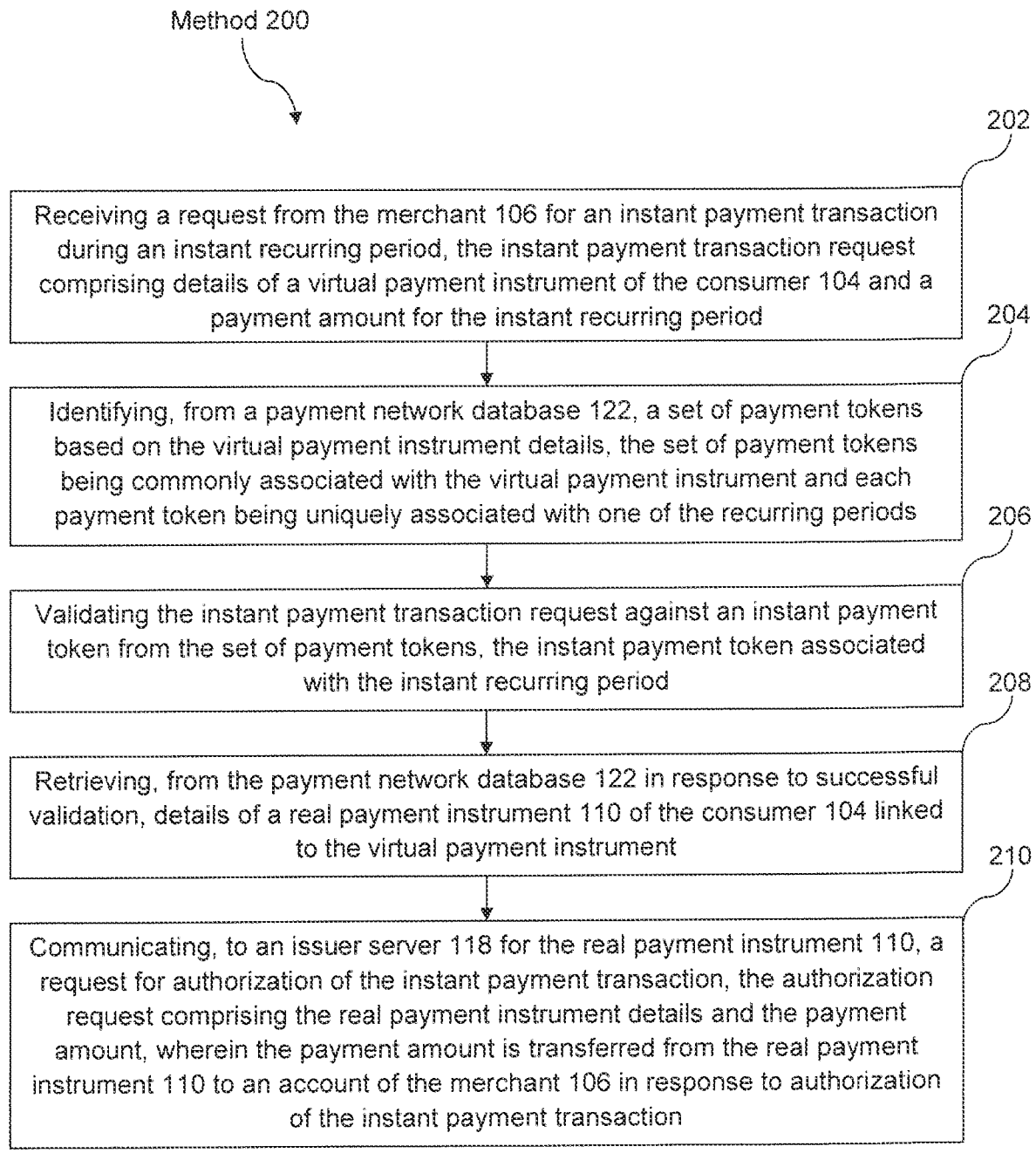
FIG. 2 is a flowchart illustration of a computerized method implemented on a payment network server for processing recurring payment transactions, in accordance with embodiments of the present disclosure.

Further with reference to FIG. 2, there is shown a computer-implemented or computerized method 200 implemented on the payment network server 102 for processing the recurring payment transactions. A recurring payment transaction that is being processed by the payment network server 102 at any one time is referred to as an instant/current payment transaction to distinguish it from preceding and succeeding payment transactions. Particularly, the instant/current payment transaction is performed during an instant/current recurring period. The payment network server 102 includes various modules/components for performing various operations or steps of the method 200, including a transaction module 102a, a token management module 102b, an authorization module 102c, and a consumer registration module 102d.

During an instant recurring period, it becomes timely for the merchant 106 to request for a payment transaction for this instant recurring period. The merchant 106 initiates a request for an instant payment transaction during the instant recurring period. The instant payment transaction request is communicated from the merchant server 112 to the acquirer server 116 and subsequently to the payment network server 102 through the communication network 120. Alternatively, the merchant server 112 communicates with the aggregator server 114 and subsequently to the payment network server 102 through the communication network 120.

In a step 202 of the method 200, the transaction module 102a of the payment network server 102 receives a request from the merchant 106 for an instant payment transaction during an instant recurring period. The instant payment transaction request includes details of a virtual payment instrument of the consumer 104 and a payment amount for the instant recurring period. The virtual payment instrument details are pre-provided by the consumer 104 to the merchant 106, such as when the consumer 104 subscribes to a service offered by the merchant 106. The payment amount is pre-agreed between the consumer 104 and the merchant 106, such as the recurring charges for the subscription service. For the instant payment transaction, the payment amount refers to the funds to be transferred from the consumer 104 to an account of the merchant 106 after the instant payment transaction has been processed for this instant recurring period.

In a step 204, the token management module 102b of the payment network server 102 identifies, from a payment network database 122, a set of payment tokens based on the virtual payment instrument details. The set of payment tokens is commonly associated with the virtual payment instrument, and each payment token is uniquely associated with one of the recurring periods. As an example, there are twelve recurring periods in a series of monthly recurring periods through a year. There is one unique payment token associated with each of the twelve recurring periods, and all twelve payment tokens are commonly associated with the same virtual payment instrument of the consumer 104.

In a step 206, the token management module 102b validates the instant payment transaction request against an instant payment token from the set of payment tokens, the instant payment token associated with the instant recurring period. The instant payment token is associated with (e.g. by encoding) details of the recurring period associated therewith, as well as details of the consumer payment instrument 110, when the consumer 104 registers for the virtual payment instrument. Particularly, the consumer registration module 102d of the payment network server 102 performs a consumer registration procedure to generate the virtual payment instrument and the details thereof based on the consumer payment instrument 110, i.e. the real payment instrument, wherein the virtual payment instrument is associated with or linked to the real payment instrument 110.

In a step 208, the token management module 102b retrieves, from the payment network database 122 in response to successful validation of the instant payment transaction request, details of the real payment instrument 110 linked to the virtual payment instrument. The real payment instrument details include an identifier and security data of the real payment instrument 110, For example, the real payment instrument 110 is a credit card and the details thereof include the credit card number, expiry date, security/verification code, and authentication code (e.g. PIN).

In a step 210, the authorization module 102c of the payment network server 102 communicates, to the issuer server 118 for the real payment instrument 110, a request for authorization of the instant payment transaction, the authorization request including the real payment instrument details and the payment amount. The authorization request is subsequently processed by the issuer server 118 in a standard manner readily known to the skilled person. The payment amount is transferred from the real payment instrument 110 of the consumer 104 to the account of the merchant 106 in response to authorization of the instant payment transaction.

Therefore, with the system 100 and method 200, the consumer 104 can provide the merchant 106 with details of a virtual payment instrument instead of a real payment instrument 110. This protects the sensitive information of the real payment instrument 110 and prevents the merchant 106 from abusing it. The merchant 106 can use the virtual payment instrument details to request for recurring payment transactions. By not providing the merchant 106 with real payment instrument details, the real payment instrument 110 would not be compromised during or after all the recurring periods for the recurring payment transactions.

Each payment transaction request is validated against a payment token which is uniquely associated with one of the recurring periods. Each payment token is thus intended to be used only once for the respective recurring period. The validation ensures that the payment transaction requests match the respective payment tokens. This provides assurance to the consumer 104 that the number of recurring payment transactions is limited to the number of payment tokens, mitigating the risk of the merchant 106 making fraudulent or excessive numbers of recurring payment transactions. The merchant 106 would not be able to continue to request payment transactions using the virtual payment instrument details after the end of the series of recurring periods because there is no payment token associated with any period after that.

The instant payment token may be nullified in response to authorization of the instant payment transaction. Nullification of the instant payment token renders it null and void for any further use after the instant payment transaction has been authorized and completed. For example, the instant payment token is nullified by modifying it such that it is considered as used, void, or invalid. Alternatively, the instant payment token is nullified by deleting or expunging the instant payment token from the payment network database 122.

In many situations, the consumer 104 has signed up for a contractual or perpetual service with the merchant 106. The merchant 106 may continue to request recurring payments for each recurring period as long as the service is still active. The consumer 104 may choose to terminate the service at some point the remaining unused payment tokens would be nullified, thereby preventing the merchant 106 from continuing to request recurring payments. Moreover, instead of terminating the service, the consumer 104 may want to pause the service and not incur expenses during the pause duration. The consumer 104 may request for the payment tokens associated with the recurring periods in the pause duration to be nullified, thereby preventing the merchant 106 from requesting payments in the pause duration.

Description of Embodiments

References to "an embodiment/example", "another embodiment/example", "some embodiments/examples", "some other embodiments/examples", and so on, indicate that the embodiment(s)/example(s) so described may include a particular feature, structure, characteristic, property, element, or limitation, but that not every embodiment/example necessarily includes that particular feature, structure, characteristic, property, element or limitation. Furthermore, repeated use of the phrase "in an embodiment/example" or "in another embodiment/example" does not necessarily refer to the same embodiment/example.

The terms "comprising", "including", "having", and the like do not exclude the presence of other features/elements/steps than those listed in an embodiment. Recitation of certain features/elements/steps in mutually different embodiments does not indicate that a combination of these features/elements/steps cannot be used in an embodiment.

As used herein, the terms "component", "module," "system", "apparatus", "interface", and the like are generally intended to refer to a computer-related entity, either hardware, a combination of hardware and software, software, or software in execution. For example, a component or a module may be, but is not limited to being, a process running on a processor, a processor, an object, an executable, a thread of execution, a program, and/or a computer. By way of illustration, both an application running on a controller and the controller can be a component/module. One or more components/modules may reside within a process and/or thread of execution. A component/module may be localized on one computer and/or distributed among a plurality of computers.

As used herein, the terms "a" and "an" are defined as one or more than one. The term "set" is defined as a non-empty finite organization of elements that mathematically exhibits a cardinality of at least one (e.g. a set as defined herein can correspond to a unit, singlet, or single-element set, or a multiple-element set), in accordance with known mathematical definitions. The recitation of a particular numerical value or value range herein is understood to include or be a recitation of an approximate numerical value or value range.

While various terms as used in representative or exemplary embodiments of the present disclosure are defined herein, the definitions of these terms are not intended to be limited as such and are in addition to their plain meanings according to standard English dictionaries.

In various embodiments of the present disclosure, the electronic system 100 includes the payment network server 102 for processing payment transactions between the consumer 104 and the merchant 106, the payment transactions recurring over a series of recurring periods. The recurring periods are discrete and individually distinct from another, each recurring period having a common duration. In some embodiments, the series of recurring periods is finite with a defined number of discrete recurring periods including a final/last recurring period. In some other embodiments, the series of recurring periods is continual without a defined final/last recurring period. The system 100 further includes the consumer electronic device 108, consumer payment instrument 110, merchant server 112, aggregator server 114, acquirer server 116, and issuer server 118, wherein one or more or all of which are communicable with one another through the communication network 120.

The payment network server 102 is a computer server associated with a payment network of various payment instruments and which is operated by an intermediary entity. Typically, the intermediary entity is a card association, such as a credit card association, that facilitates communications between acquirer institutions and issuer institutions to authorize and fund transactions performed using the payment instruments including the consumer payment instrument 110. The payment network settles the transactions between various acquirer institutions and issuer institutions, when payment instruments such as credit cards are used for initiating transactions including payment transactions between consumers 104 and merchants 106. Some examples of payment networks operated by intermediary entities include the Banknet payment network operated by Mastercard® and the VisaNet payment network operated by Visa®. Some other examples of intermediary entities that operate payment networks include American Express®, Discover®, and Diners Club®. In many embodiments, the payment network server 102 and the payment network associated therewith facilitate the processing of recurring payment transactions between the consumer 104 and the merchant 106. The payment network may be integrated with or complement the communication network 120 to facilitate said processing. The payment network server 102 generates credit and/or debit notifications based on processing of a payment transaction. The credit and/or debit notifications are communicated to the acquirer server 116 and issuer server 118 for crediting and/or debiting the respective financial accounts corresponding to the payment transaction. More specifically, upon processing of the payment transaction, the consumer payment instrument 110 is debited and the merchant financial account is credited, thereby transferring funds from the consumer payment instrument 110 to the merchant financial account.

The consumer 104 is an individual who is an account holder of an account which refers to any financial account, such as current account, savings account, trading account, or any account associated with a payment instrument including the consumer payment instrument 110. In some embodiments, the account is a bank account maintained by a financial institution, such as an issuer institution or bank. In some other embodiments, the account is a digital wallet maintained by a merchant 106, the intermediary entity, an issuer institution or bank, or a third-party service provider. The account is linked to the consumer payment instrument 110 and thus the consumer payment instrument 110 stores identification information of the account. The account identification information may be stored in the form of an electronic chip or a machine-readable magnetic strip embedded in the consumer payment instrument 110. The account identification information may include an account number and the name of the account holder (i.e. consumer 104). The consumer payment instrument 110 has a unique identifier, an expiry date, security data, and type. The payment instrument identifier, expiry date, security data, and type constitute details of the consumer payment instrument 110.

The consumer payment instrument 110 refers to any suitable cashless payment mechanism, such as payment cards or transaction cards, which the consumer 104 may use to perform transactions, such as deposits and withdrawals, credit transfers, purchase payments, payment transactions, and the like. In some embodiments, the consumer payment instrument 110 is a physical card, such as credit card, debit card, membership card, promotional card, contactless card, charge card, frequent flyer card, gift card, prepaid card, or the like. The consumer payment instrument 110 may be radio frequency identification (RFID) or near field communication (NFC) enabled for performing contactless payment transactions. In some other embodiments, the consumer payment instrument 110 is stored electronically in memory of the consumer electronic device 108, such as on an application or digital wallet resident or operative on the consumer electronic device 108.

The consumer electronic device 108 is an electronic/communication device that enables the consumer 104 to purchase goods, products, and/or services through e-commerce sites (e.g. card-not-present payment transactions) or at a point-of-sale (POS) terminal (e.g. physical in-store payment transactions) associated with the merchant 106. The consumer electronic device 108 may be a mobile device, mobile phone, smartphone, personal digital assistant (PDA), key fob, transponder device, NFC-enabled device, tablet, phablet, laptop, computer, other communication device, or the like.

In many embodiments, the consumer payment instrument 110 is associated with or linked to a virtual payment instrument generated by the payment network server 102. Details of the virtual payment instrument are communicated from the merchant 106 to the payment network server 102 to request an instant payment transaction during an instant recurring period. Communication of the virtual payment instrument details occur through the merchant server 112 and acquirer server 116/aggregator server 114.

The merchant 106 is a business or commercial entity that offers various goods, products, and/or services in exchange for payments. The merchant 106 may establish an account with a financial institution, such as an acquirer institution or bank to accept the payments from the consumers, including from the consumer 104 by use of the consumer payment instrument 110. Alternatively, the merchant 106 may establish an account with a payment aggregator which provides a service for merchants to process payment transactions. The merchant 106 operates the merchant server 112 that is a computer server associated with a merchant apparatus or a POS terminal in a merchant's retail premises or an e-commerce site on which transactions can be initiated by the consumers.

The aggregator server 114 is a computer server operated by a payment aggregator that aggregates various merchants including the merchant 106 on a single platform. The payment aggregator serves as an interface between the merchant server 112 and payment network server 102, so that the merchant 106 does not need to setup an account with the acquirer institution. Some non-limiting examples of payment aggregators include PayPal®, Stripe®, Atos®, and CyberPlat®. In some embodiments, the payment network server 102 and aggregator server 114 are separate entities. The aggregator server 114 receives the instant payment transaction request from the merchant server 112 and communicates the request to the payment network server 102. In some other embodiments, the functionalities of the aggregator server 114 are integrated into the payment network server 102 such that they operate as an integrated or single entity.

The acquirer server 116 is a computer server operated by an acquirer institution or bank at which merchants including the merchant 106 maintain merchant accounts to receive and accept payments for goods, products, and/or services purchased by various consumers including the consumer 104. Account information of the merchant accounts established with the acquirer institution is stored as account profiles in an acquirer database of the acquirer institution. The acquirer database may reside locally on the acquirer server 116, or alternatively on a remote or cloud server communicatively linked to the acquirer server 116. The acquirer institution processes payment transaction requests received from the merchant server 112 by using the acquirer server 116. The acquirer server 116 communicates the payment transaction requests to the payment network server 102 and/or issuer institutions through the communication network 120. The acquirer server 116 is configured for crediting the financial account of the merchant 106 maintained in the acquirer institution upon processing of the payment transaction.

The issuer server 118 is a computer server operated by an issuer institution or bank Issuer or issuer bank where accounts of consumers are established and maintained. The issuer institution ensures payment for authorized payment transactions in accordance with various payment network regulations and local legislation. Account information of the accounts established with the issuer institution is stored as account profiles in an issuer database of the issuer institution. The issuer database may reside locally on the issuer server 118, or alternatively on a remote or cloud server communicatively linked to the issuer server 118. The account information may include an account balance, a credit line, details of an account holder, transaction history of the account holder, account identification information, and the like. The details of the account holder may include identification number, name, age, gender, date of birth, physical attributes, contact numbers, email addresses, and the like of the account holder. The issuer server 118 is configured for debiting the consumer payment instrument 110, or an account of the consumer 104 linked thereto that is maintained in the issuer institution, upon processing of the payment transaction.

As used herein, the term "institution" is not necessarily limited to organizations which are legally constituted as banks. In some jurisdictions or countries, other organizations may be permitted to maintain financial accounts such as a payment card account. An institution may thus be one of the following: a bank, financial technology company, telecommunication company, and financial institution. It will be appreciated that the acquirer server 116 and issuer server 118 receive various credit and debit notifications/messages from the payment network server 102. Based on the credit and debit notifications, the acquirer server 116 credits the merchant account and issuer server 118 debits the consumer account or consumer payment instrument 110 linked thereto. It will be further appreciated that said crediting and debiting via the acquirer server 116 and issuer server 118 respectively will be readily apparent to the skilled person and may include processing via the conventional four-party system or three-party system.

The communication network 120 is a medium or environment through which content, notifications, and/or messages are communicated among various entities, including the payment network server 102, consumer electronic device 108, merchant server 112, aggregator server 114, acquirer server 116, and issuer server 118. Some non-limiting examples of the communication network 120 include a virtual private network (VPN), wireless fidelity (Wi-Fi) network, light fidelity (Li-Fi) network, local area network (LAN), wide area network (WAN), metropolitan area network (MAN), satellite network, Internet, fiber optic network, coaxial cable network, infrared (IR) network, radio frequency (RF) network, and any combination thereof. Various entities in the communication network 120 may connect to the communication network 120 in accordance with various wired and wireless communication protocols, such as Transmission Control Protocol/Internet Protocol (TCP/IP), User Datagram Protocol (UDP), 2nd to 5th Generation (2G to 5G) communication protocols, Long Term Evolution (LTE) communication protocols, and any combination thereof. Each of the payment network server 102, consumer electronic device 108, merchant server 112, aggregator server 114, acquirer server 116, and issuer server 118 includes a data communication or transceiver module to communicate and transmit/receive data over the communication network 120. Some non-limiting examples of a transceiver module include an antenna module, a radio frequency transceiver module, a wireless transceiver module, a Bluetooth transceiver module, an Ethernet port, a Universal Serial Bus (USB) port, or any other module/component/device configured for transmitting and receiving data.

In various embodiments, a software or mobile application is installed/resident/operative/executable on the consumer electronic device 108 to generate a virtual payment instrument and details thereof for the consumer 104. The virtual payment instrument details are used by the merchant 106 during performance of the method 200. In one embodiment, the application is provided by the intermediary entity such that the application is hosted on the payment network server 102 and the consumer electronic device 108 is directly communicable with the payment network server 102. In another embodiment, the application is provided by the merchant 106 such that the application is hosted on the merchant server 112 and the consumer electronic 108 is communicable with the payment network server 102 via the merchant server 112. In yet another embodiment, the application is provided by a third-party service provider such that the application is hosted on a server of the third-party service provider and the consumer electronic 108 is communicable with the payment network server 102 via the third-party server. In some embodiments, the application is configured to also function as a digital wallet that is linked to one or more payment instruments including the consumer payment instrument 110.

Figure 3A:
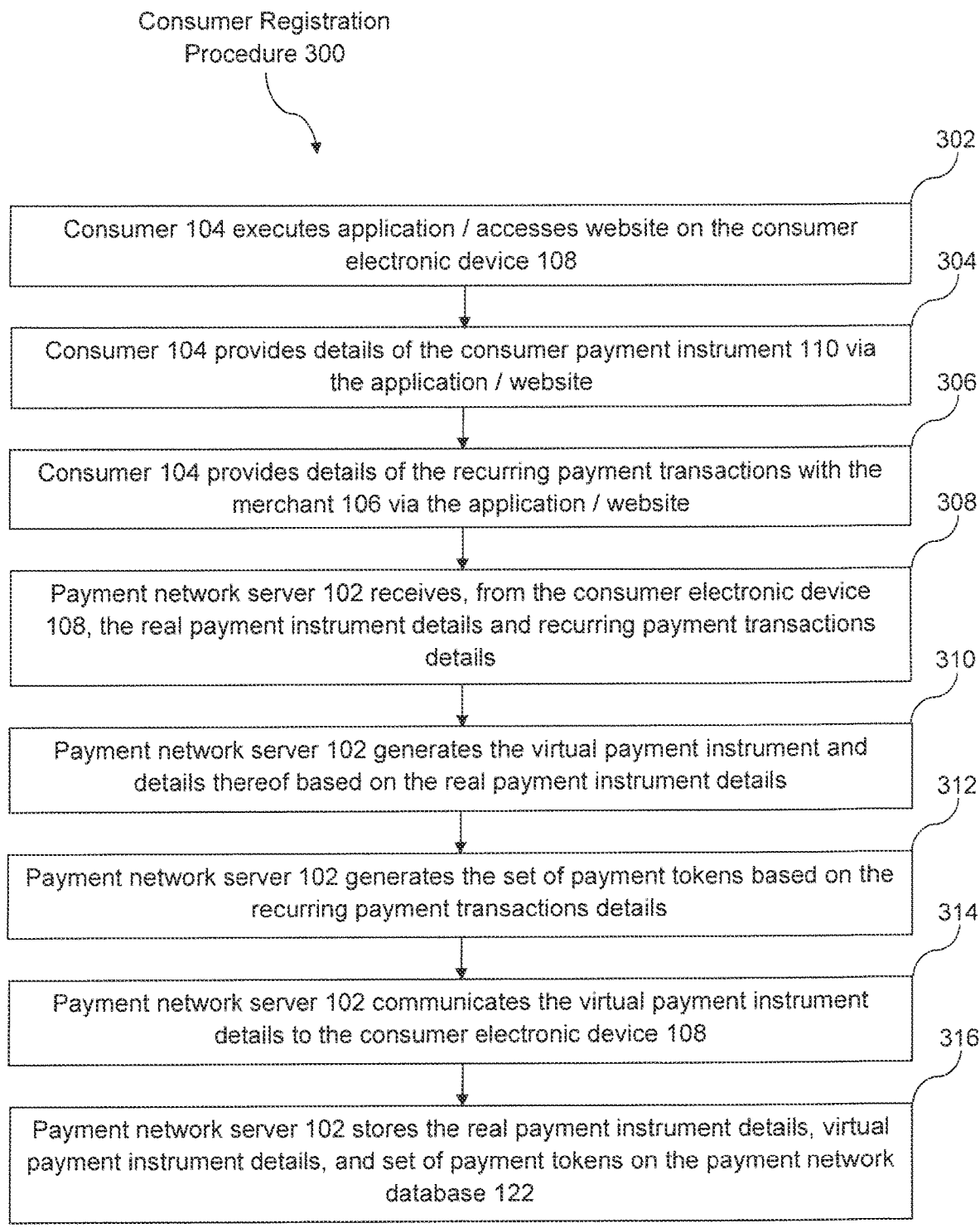
FIG. 3A is a flowchart illustration of a consumer registration procedure, in accordance with embodiments of the present disclosure.

The consumer 104 first enrolls or registers with the intermediary entity via the application to generate the virtual payment instrument and details thereof for the recurring payment transactions. FIG. 3A illustrates a consumer registration procedure or method 300 for generating the virtual payment instrument and details thereof. Various steps of the consumer registration procedure 300 are implemented on and performed by the payment network server 102, specifically by the consumer registration module 102d thereof.

In a step 302 of the consumer registration procedure 300, the consumer 104 executes the application on the consumer electronic device 108. Alternatively, the consumer 14 may initiate the consumer registration procedure 300 via a website interface accessible by the consumer electronic device 108. The application or website presents a graphical user interface (GUI) 502 on the consumer electronic device 108 for performing the consumer registration procedure 300.

In a step 304, the consumer 104 provides details of the consumer payment instrument 110, i.e. the real payment instrument, via the application or website. In many embodiments, the consumer payment instrument 110 is a credit card and the details include payment details that enable processing of payments from the consumer payment instrument 110. It will be appreciated that the consumer payment instrument details or real payment instrument details are in accordance with one or more standards for the interchange of payment transaction messages, such as the ISO 8583 standard. For example, the real payment instrument 110 is a credit card and the real payment instrument details include the name of the issuer institution, credit card number, expiry date, security code, authentication code or PIN, and name on the credit card. Optionally, the consumer 104 may also provide his/her contact details, such as phone number and/or email address, during the step 304.

In a step 306, the consumer 104 provides details of the recurring payment transactions with the merchant 106 via the application or website. These recurring payment transactions may be a result of the consumer 104 purchasing products and/or services from the merchant 106. In one example, the consumer 104 subscribed to a content streaming service provided by the merchant 106, such as Netflix. The recurring payment transactions would be for recurring payments to the merchant 106 during the subscription period of the content streaming service, such as monthly payments for a two-year subscription period. In another example, the consumer 104 purchased some products from the merchant 106 and wanted to pay for the products in installments. The recurring payment transactions would be for recurring installment payments to the merchant 106, such as six monthly installments over a half-year period. Accordingly, the consumer 104 is in a contractual agreement with the merchant 106, in which the consumer 104 agrees to make recurring payments over a contractual period to the merchant 106 in exchange for the products and/or services. Recurring payment transactions are initiated by the merchant 106 during the contractual period until the contractual period ends, or until the contractual agreement is terminated by either party or mutual agreement.

In some embodiments, the consumer 104 signs up for a long-term service package with the merchant 106, such as telecommunication service, life insurance, endowment policies, and the like. These services provided by the merchant 106 do not have a finite contractual period. On the contrary, they are perpetual and the consumer 104 continues to pay for recurring payments at recurring periods continually until the service is terminated by either party or by mutual agreement. Accordingly, the series of recurring periods is continual without any defined end date.

In one embodiment, the series of recurring periods is finite. The recurring payment transactions details include a start date, an end date, and a recurring period duration. The start date refers to the start of the contractual period and determines a first recurring period in the series of recurring periods. The end date refers to the end of the contractual period and determines a final recurring period in the series. The recurring period duration relates to the frequency of the recurring payment transactions and determines a number of discrete recurring periods in the series. FIG. 3B illustrates an example of the recurring payment transactions details. In this example, the start date is 1 Jan. 2018, the end date is 31 Dec. 2018, and the recurring period duration is one month. Accordingly, the series of recurring periods continues from 1 Jan. 2018 to 31 Dec. 2018, with a total of twelve recurring periods in the series, each recurring period for a particular month.

In another embodiment, the series of recurring periods is continual. The recurring payment transactions details include a start date and a recurring period duration but does not include an end date. The recurring payment transactions details may further include permission from the consumer 104 to allow the payment network server 102 to continually extend the series of recurring periods.

In some embodiments, the recurring payment transactions details further include a set of common dates in the series of recurring periods. Following the example in FIG. 3B, there may be one common date such as the 15th of every month. Alternatively, the set of common dates may be a range of dates, such as from 10th to 20th of every month, or from 10th to 12th and 14th to 16th of every month. The set of common dates is used to determine if the recurring payment transaction requests are received on the common dates in every recurring period, which can be any date in the set of common dates. For a recurring period, the recurring payment transaction request would only be processed if it is received by the payment network server 102 on the common dates in the recurring period. Using another example, the recurring period may be one year instead of one month. The set of common dates in the one-year recurring period may be a single date such as 15th of June. Alternatively, the set of common dates in the one-year recurring period may be a range of dates such as 1st June to 31st July. Accordingly, there may be one or more common dates in every recurring period in the series of recurring periods. Restricting the recurring payment transactions to be on the common dates help the consumer 104 to benefit more from expenditure on the consumer payment instrument 110, especially if the consumer 104 wants the recurring payment transactions to occur before the monthly statement date of the consumer payment instrument 110.

In some embodiments, the recurring payment transactions details further include one common date and a common time thereof. For example, the common date is the 15th of every month and the common time is 1300 hours or 1 pm. The common date and time is used to determine if the recurring payment transaction requests are received on the common date in every recurring period and after the common time of every common date. For a recurring period, the recurring payment transaction request would only be processed if it is received by the payment network server 102 on the common date in the recurring period and after the common time. In another embodiment, if the common time is not specifically provided by the consumer 104, the default common time would be 0000 hours representing the start of the common date.

In some embodiments, the recurring payment transactions details further include a common maximum payment amount. The common maximum payment amount is used to determine if the payment amounts in the recurring payment transaction requests for every recurring period exceeds the common maximum payment amount. Following the example in FIG. 3B, the common maximum payment amount is $100 such that the recurring payment transaction request for a recurring period would only be processed if the payment amount in the request were $100 or less.

In some embodiments, instead of a set of common dates and/or common maximum payment amount, the recurring payment transactions details include a set of dates and/or maximum payment amount associated with each recurring period. Every recurring period in the series of recurring periods would thus have its own set of dates to determine if the recurring payment transaction request for the respective recurring period is received on the set of dates, which can be any date in the set of dates. Similarly, every recurring period would have its maximum payment amount to determine if the payment amounts in the recurring payment transaction request for the respective recurring period exceeds the common maximum payment amount.

In some embodiments, the recurring payment transactions details further include merchant reference data. The merchant reference data may include merchant identification data and is used to determine if the correct merchant is initiating the recurring payment transaction requests for every recurring period. Some non-limiting examples of the merchant identification data include merchant identification number (MID), merchant name, merchant address, and at least one merchant category code (MCC). The merchant reference data is in accordance with one or more standards for the interchange of payment transaction messages, such as the ISO 8583 standard.

In a step 308, the payment network server 102 receives, from the consumer electronic device 108, the real payment instrument details and recurring payment transactions details. In some embodiments, the communication of the real payment instrument details and recurring payment transactions details occurs via the merchant server 112. In a step 310, the payment network server 102 generates the virtual payment instrument and details thereof based on the real payment instrument details. The virtual payment instrument details may include a virtual payment instrument identifier or number, expiry date, and security code. Like the real payment instrument details, the virtual payment instrument details are also in accordance with one or more standards for the interchange of payment transaction messages, such as the ISO 8583 standard. FIG. 3C illustrates a mapping between the virtual payment instrument and real payment instrument 110.

In some embodiments before generating the virtual payment instrument and details thereof, the consumer registration procedure 300 includes another step in which the payment network server 102 communicates a request for authentication of the real payment instrument 110 to the issuer server 118 operated by the issuer institution for the real payment instrument 110. The authentication request includes the real payment instrument details, such as the identifier and security data (e.g. credit card number and PIN). This additional step enables the issuer institution to verify the real payment instrument 110 to ensure that the consumer 104 has provided an authentic and valid payment instrument. Particularly, the issuer institution determines if the real payment instrument 110 is linked to an account maintained at the issuer institution and if the real payment instrument 110 is still active. The payment network server 102 generates the virtual payment instrument and details thereof upon receiving a notification/message from the issuer server 118 indicating successful authentication of the real payment instrument 110.

In a step 312, the consumer registration module 102d cooperates with the token management module 102b of the payment network server 102, wherein the token management module 102b is configured for generating the set of payment tokens based on the recurring payment transactions details. The set of payment tokens is commonly associated with the virtual payment instrument such that all of the payment tokens can be identified based on the virtual payment instrument details. In addition, each payment token is uniquely associated with one of the recurring periods. Following the example in FIG. 3B, twelve payment tokens would be generated in the step 312, each payment token uniquely associated with a particular month from January 2018 to December 2018. Optionally, the set of payment tokens is associated with a set of common dates, common time, common maximum payment amount, and/or merchant reference data. Further optionally, the set of payment tokens is commonly associated with some details of the real payment instrument 110, such as a partial identifier or card number thereof. It will be readily understood by the skilled person that the step 312 is a tokenization process that replaces sensitive data of the consumer 104, such as the real payment instrument details and recurring payment transactions details, with secure surrogate data in the form of the payment tokens.

Each consumer has a real payment instrument which is associated with or linked to a virtual instrument which is in turn associated with or linked to a set of payment tokens. These associations are stored on the payment network database 122. FIG. 3D illustrates an example of the set of payment tokens associated with the virtual payment instrument linked to the real payment instrument 110. In this example, there are twelve payment tokens, each for a particular month from January 2018 to December 2018. Each payment token is associated with the virtual payment instrument and date data for the respective month. Each payment token may optionally be further associated with one or more of the real payment instrument details, set of common dates, common maximum payment amount, and optionally a common time.

Referring to the payment token for January 2018 as an example, the payment token may be encoded with a sequence of values, such as numerical digits, alphanumeric characters, hexadecimal values, and the like. In some embodiments, the sequence of values is a sequence of numerical digits. In one embodiment as shown in FIG. 3D, the 1st to 4th values indicate a partial identifier of the virtual payment instrument, such as the last four values of the virtual payment instrument identifier/number. This provides an added layer of identification to match the payment token to the virtual payment instrument, although the payment token is identifiable from the master dataset even without encoding the partial identifier of the virtual payment instrument. In another embodiment, the 1st to 4th values indicate a partial identifier of the real payment instrument 110, such as the last four values of the real payment instrument identifier (e.g. credit card number). In another embodiment, part of the sequence of values indicates a partial identifier of the virtual payment instrument and partial identifier of the real payment instrument.

In one embodiment as shown in FIG. 3D, the 5th to 8th values indicate the date data of the recurring period for the payment token. The values may be in the MMYY form which would be 0118 for January 2018. Optionally, the 9th and 10th values indicate the common date which is used to determine if the payment transaction request is received on the common date. The values are in the DD form which may be 15 for 15th January 2018. Further optionally, some of the values indicate the common maximum payment amount which is used to determine if the payment amount in the payment transaction request exceeds it. As shown in FIG. 3D, the 11th to 13th values indicate 100 to represent the common maximum payment amount as $100. Further optionally, some of the values indicate a common time of the common date, such as 1300 representing 1300 hours or 1 pm. In another example, instead of one common date, there is a range of common dates for the payment token. A sequence of four values or numerical digits may be used, such as 1020 which refers to the common dates 10th to 20th January 2018.

Although some examples sequence of values of the payment tokens are shown in FIG. 3D, the sequence of values may be rearranged in another sequence as will be readily understood by the skilled person. Furthermore, additional values that relate to other relevant data for the payment tokens, real payment instrument 110, virtual payment instrument, and/or recurring periods may be included in the sequence of values. It will also be appreciated that the payment tokens may encode data in another form instead of the sequence of values, such as in codified data or barcodes. Some non-limiting examples include Quick Response (QR) code, barcode, EZcode, high capacity color barcode, ShotCode, MaxiCode, GTIN12 code, GTIN-13 code, and Aztec code.

In a step 314, the payment network server 102 communicates the virtual payment instrument details to the consumer electronic device 108 so that the consumer 104 has a record of the virtual payment instrument details. In some embodiments, the application executed on the consumer electronic device 108 is provided by the intermediary entity or third-party service provider. After receiving the virtual payment instrument details, the consumer 104 provides them to the merchant 106 so that the merchant may request for the recurring payment transactions at the respective recurring periods, wherein each payment transaction request includes the virtual payment instrument details. In some other embodiments, the application is provided by the merchant 106 and the merchant 106 may receive a merchant copy of the virtual payment instrument details after the payment network server 102 has generated the virtual payment instrument and details thereof. Optionally, the merchant 106 receives a merchant copy of the set of payment tokens after the payment network server 102 has generated the payment tokens. The merchant 106 may store the merchant copy of the virtual payment instrument details and payment tokens on a database of the merchant 106. The merchant database may reside locally on the merchant server 112, or alternatively on a remote or cloud server communicatively linked to the merchant server 112.

In a step 316, the payment network server 102 stores the real payment instrument details, virtual payment instrument details, and set of payment tokens on the payment network database 122. The payment network database 122 may reside locally on the payment network server 102, or alternatively on a remote or cloud server communicatively linked to the payment network server 102. The steps 314 and 316 may be performed in parallel or one after the other.

Figure 4:
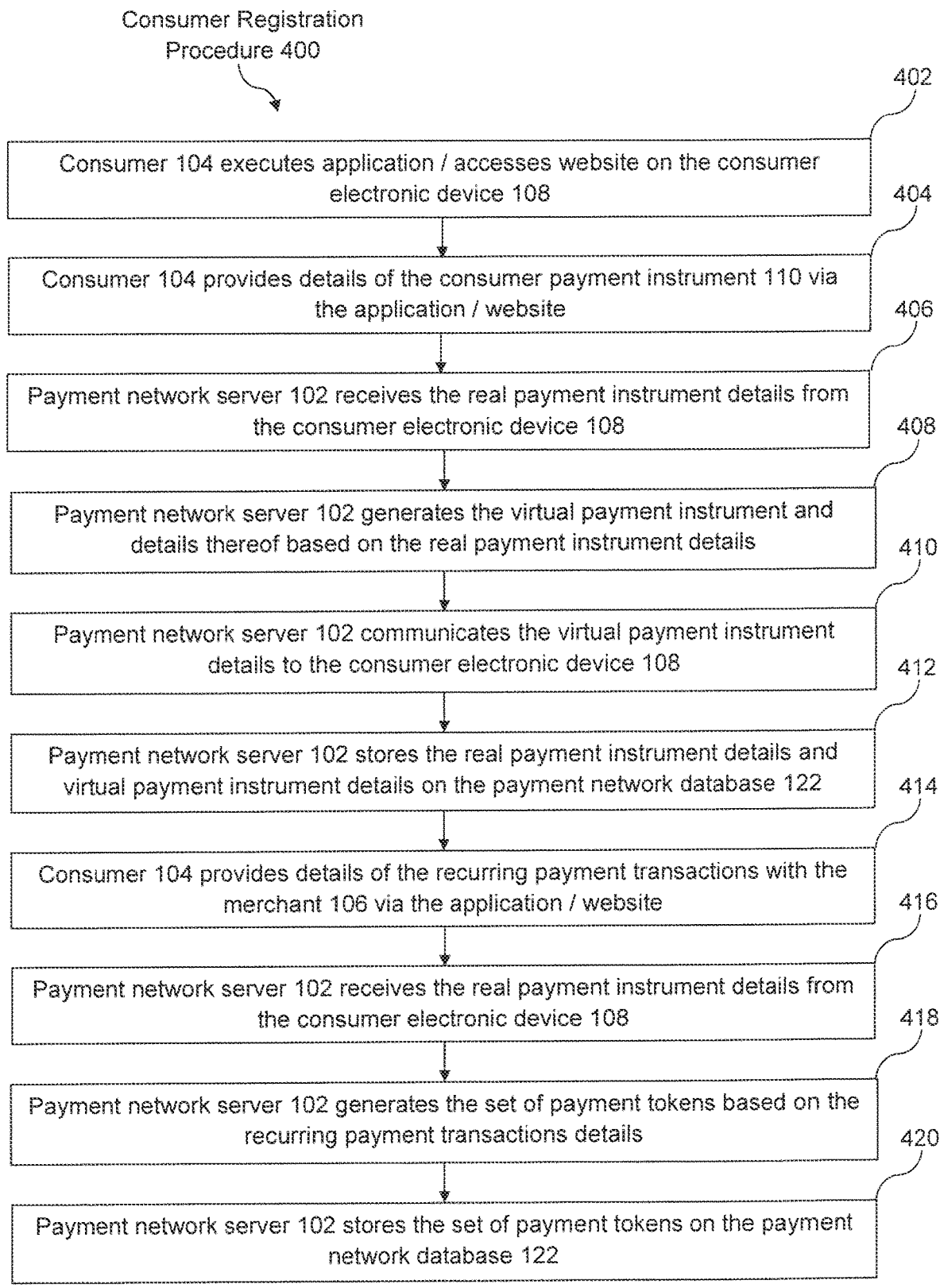
FIG. 4 is another flowchart illustration of a consumer registration procedure, in accordance with embodiments of the present disclosure.

In some embodiments, various steps of the consumer registration procedure 300 may occur in another sequence. FIG. 4 illustrates another consumer registration procedure or method 400 for generating the virtual payment instrument and details thereof according to such embodiments. It will be appreciated that various aspects of the consumer registration procedure 300 apply similarly or analogously to the consumer registration procedure 400, and such aspects are omitted from the description of the consumer registration procedure 400 for purpose of brevity.

In a step 402 of the consumer registration procedure 400, the consumer 104 executes the application or accesses the website on the consumer electronic device 108. In a step 404, the consumer 104 provides details of the consumer/real payment instrument 110, i.e. the real payment instrument, via the application or website.

In a step 406, the payment network server 102 receives the real payment instrument details from the consumer electronic device 108. In a step 408, the payment network server 102 generates the virtual payment instrument and details thereof based on the real payment instrument details. In a step 410, the payment network server 102 communicates the virtual payment instrument details to the consumer electronic device 108. In some embodiments, the merchant 106 receives a merchant copy of the virtual payment instrument details after the payment network server 102 has generated the virtual payment instrument and details thereof. Optionally, the merchant 106 receives a merchant copy of the set of payment tokens after the payment network server 102 has generated the payment tokens. In a step 412, the payment network server 102 stores the real payment instrument details and virtual payment instrument details on the payment network database 122. Optionally, the merchant stores the merchant copy of the virtual payment instrument details and payment tokens on the merchant database.

After receiving the virtual payment instrument details, in a step 414, the consumer 104 provides details of the recurring payment transactions with the merchant 106 via the application or website.

In a step 416, the payment network server 102 receives the recurring payment transactions details from the consumer electronic device 108. In a step 418, the payment network server 102 generates the set of payment tokens based on the recurring payment transactions details. In a step 420, the payment network server 102 stores the set of payment tokens on the payment network database 122.

Figure 5:
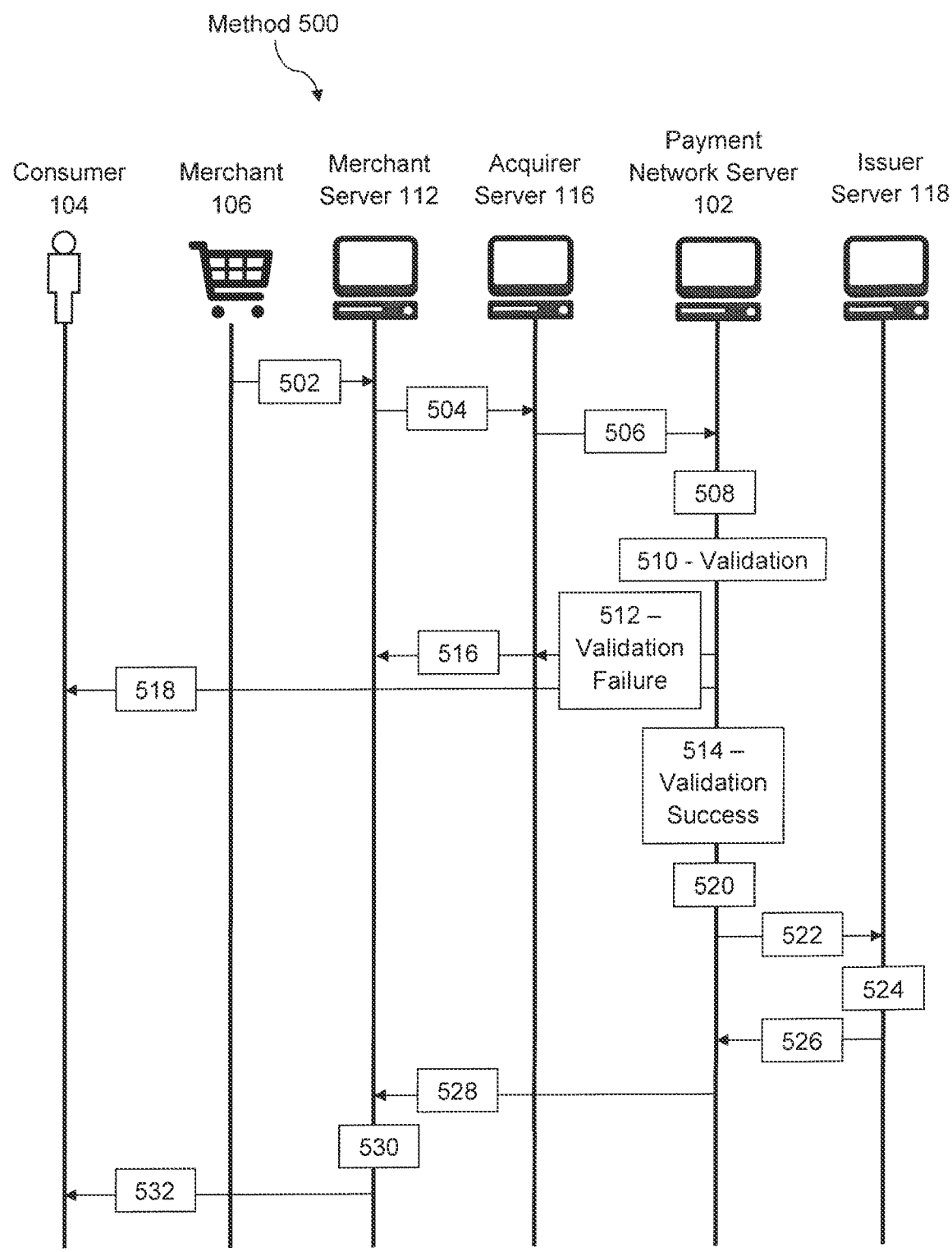
FIG. 5 is a schematic illustration of a computerized method for processing recurring payment transactions, in accordance with embodiments of the present disclosure.

In various embodiments with reference to FIG. 5, there is a computer-implemented or computerized method 500 implemented on the system 100 for processing the recurring payment transactions. In order for the merchant 106 to initiate the recurring payment transactions, the merchant 106 has to know the virtual payment instrument details which may be pre-provided by the consumer 104. Alternatively, the payment network server 102 may communicate the virtual payment instrument details and/or a merchant copy of the payment tokens to the merchant 106, such as to the merchant server 112, after generating the virtual payment instrument details for the consumer 104.

A recurring payment transaction that is being initiated by the merchant 106 at any one time is referred to as an instant/current payment transaction to distinguish it from preceding and succeeding payment transactions. Particularly, the instant/current payment transaction is performed during an instant/current recurring period. As an example, the instant/current recurring period is January 2018 and the merchant 106 is initiating the instant payment transaction for January 2018. Furthermore, the merchant 106 may initiate the instant payment transaction at any date or a specific date in January 2018.

In some embodiments of the method 500, the merchant 106 has an account with an acquirer institution, and the merchant server 112 is communicable with the acquirer server 116. The acquirer server 116 is further communicable with the payment network server 102 through the communication network 120. In some other embodiments of the method 500, the merchant 106 has an account with a payment aggregator, and the merchant server 112 is communicable with the aggregator server 114. The aggregator server 114 is further communicable with the payment network server 102 through the communication network 120. It will be appreciated that various aspects of the method 500 apply analogously whether the system 100 operates with the acquirer server 116 or aggregator server 114.

In a step 502 of the method 500, the merchant 106 initiates a request for the instant payment transaction during the instant recurring period. In a step 504, the merchant server 112 communicates the instant payment transaction request to the acquirer server 116 through the communication network 120. The instant payment transaction request includes details of a virtual payment instrument of the consumer 104 and a payment amount for the instant recurring period. Optionally, if the merchant 106 has a merchant copy of the payment tokens, the instant payment transaction request may further include the merchant copy of the instant payment token associated with the instant recurring period. The instant payment transaction request is in accordance with one or more standards for the interchange of payment transaction messages, such as the ISO 8583 standard. The payment amount relates to the amount the merchant 106 is charging the consumer 104 for the instant recurring period, such as the installment payment or subscription bill for January 2018. The payment amount will be transferred from the consumer 104 to an account of the merchant 106 after the instant payment transaction has been processed for this instant recurring period. The merchant account may be maintained at the acquirer institution or payment aggregator.

In a step 506, the transaction module 102a of the payment network server 102 receives the instant payment transaction request from the acquirer server 116. In a step 508, the token management module 102b of the payment network server 102 identifies, from the payment network database 122, the set of payment tokens based on the virtual payment instrument details. The set of payment tokens is commonly associated with the virtual payment instrument, and each payment token is uniquely associated with one of the recurring periods. Each payment token is associated or encoded with date data of the respective recurring period. Each payment token may be associated or encoded with a partial identifier of the virtual payment instrument, providing an added layer of identification to match the set of payment tokens to the virtual payment instrument.

In a step 510, the token management module 102b of the payment network server 102 validates the instant payment transaction request against an instant payment token from the set of payment tokens, the instant payment token associated with the instant recurring period. Validation is a process to verify if the instant payment transaction request is valid or invalid based on existing data in the instant payment token and in accordance with a set of validation rules predetermined by the payment network server 102 and the consumer 104 during the consumer registration procedure 300/400.

For example, the instant recurring period is January 2018 and the instant payment transaction request is received during January 2018. The instant payment token would be one that is associated or encoded with date data for January 2018, e.g. digits 0118 in MMYY form. However, if the instant payment token for the instant recurring period cannot be identified or found for the instant recurring period, then validation of the instant payment transaction request is considered as failed. The payment network server 102 generates a response to said validation. In a step 512, the validation response indicates failed validation of the instant payment transaction request and the payment network server 102 communicates the validation response to the acquirer server 116. Conversely, in a step 514, the validation response indicates successful validation of the instant payment transaction request. The validation response is in accordance with one or more standards for the interchange of payment transaction messages, such as the ISO 8583 standard.

In some embodiments, the instant payment token for the instant recurring period is identified and may be associated or encoded with a set of common dates. Validation includes determining if the instant payment transaction request is received on the common dates in the instant recurring period, which can be any date in the set of common dates. For example, the set of common dates are 10th to 20th of every recurring period (e.g. month). If the instant payment transaction request is received on dates other than the common dates, such as from 1st to 9th and 21st to 31st January 2018, then validation of the instant payment transaction request fails. Conversely, if the payment transaction request is received on any date from 10th to 20th January 2018, e.g. on 15th January 2018, then validation of the instant payment transaction request succeeds.

In some embodiments, the instant payment token for the instant recurring period is identified and may be associated or encoded with a common maximum payment amount. Validation includes determining if the payment amount for the instant recurring period exceeds the common maximum payment amount. For example, the common maximum payment amount is $100 for every recurring period. If the payment amount for the instant payment transaction request exceeds $100, then validation of the instant payment transaction request fails. Conversely, if the payment amount is $100 or less, then validation of the instant payment transaction request succeeds.

In some embodiments, the instant payment token for the instant recurring period is identified and may be associated or encoded with merchant reference data. The instant payment transaction request further includes identification data of the merchant 106, such as identification number, name, address, and/or category codes of the merchant 106. The merchant identification data is in accordance with one or more standards for the interchange of payment transaction messages, such as the ISO 8583 standard. Validation includes determining if the merchant identification data in the instant payment transaction request matches the merchant reference data in the instant payment token. If they do not match, then validation of the instant payment transaction request fails. Conversely, if they match, then validation of the instant payment transaction request succeeds. Matching the merchant identification data to the merchant reference data helps to ensure that the correct merchant 106 is requesting the instant payment transaction. This would mitigate the risk of other merchants/persons/businesses making fraudulent payment transaction requests, especially if the consumer 104 has provided the virtual payment instrument details to other merchants/persons/businesses.

In some embodiments, the instant payment transaction request includes the virtual payment instrument details and the merchant copy of the instant payment token. Validation of the instant payment transaction request includes matching the merchant copy of the instant payment token against the instant payment token identified from the payment network database 122 based on the virtual payment instrument details. If they do not match or are not identical to each other, then validation of the instant payment transaction request fails. Conversely, if they match or are identical to each other, then validation of the instant payment transaction request succeeds. Having the merchant 106 communicate the merchant copy of the instant payment token provides an added layer of identification to match to the virtual payment instrument, since the payment tokens are all associated with the virtual payment instrument.

In response to the step 512 of failed validation of the instant payment transaction request, there is a step 516 in which the acquirer server 116 communicates the validation response to the merchant server 112 to inform the merchant 106 that the instant payment transaction has been declined. In a step 518, the payment network server 102 communicates an invalid request message to the consumer 104 in response to failed validation. The invalid request message informs the consumer 104 that the merchant 106 has made an invalid payment transaction request. The steps of informing the consumer 104 and the merchant 106 may be performed in parallel or one after the other.

In response to the step 514 of successful validation of the instant payment transaction request, there is a step 520 in which the token management module 102b of the payment network server 102 retrieves, from the payment network database 122, details of the real payment instrument 110 of the consumer 104 associated with or linked to the virtual payment instrument. The instant payment token may be associated or encoded with a partial identifier of the real payment instrument 110, providing an added layer of identification to match to the real payment instrument 110. The real payment instrument details include an identifier and security data of the real payment instrument 110, For example, the real payment instrument 110 is a credit card and the details thereof include the credit card number, expiry date, security/verification code (e.g. CVC or CVV), and authentication code (e.g. PIN).

In a step 522, the authorization module 102c of the payment network server 102 communicates, to the issuer server 118 for the real payment instrument 110, a request for authorization of the instant payment transaction, the authorization request including the real payment instrument details and the payment amount. The authorization request is in accordance with one or more standards for the interchange of payment transaction messages, such as the ISO 8583 standard. In a step 524, the issuer server 118 verifies the real payment instrument 110 to authorize the instant payment transaction. Conventionally, in order to authorize the instant payment transaction, the issuer server 118 is configured for verifying one or more of the credit card number, expiry date, and security code of the real payment instrument 110. The issuer server 118 may also be configured for checking an available balance of the account of the consumer 104 to determine if the available balance is sufficient for the payment amount. The available balance may include any overdraft balance available to the consumer account. The issuer server 118 then authorizes the instant payment transaction if the relevant real payment instrument details are verified and that the available balance is equal to or more than the payment amount.

In a step 526, the issuer server 118 communicates, to the payment network server 102, an authorization response indicating if the instant payment transaction is authorized or declined. The authorization response is in accordance with one or more standards for the interchange of payment transaction messages, such as the ISO 8583 standard. In a step 528, the payment network server 102 communicates the authorization response to the merchant server 112 via the acquirer server 116 to inform the merchant 106 if the instant payment transaction is authorized or declined. The payment amount for the instant payment transaction is transferred from the real payment instrument 110 of the consumer 104 to the account of the merchant 106 in response to authorization of the instant payment transaction. Specifically, the acquirer institution/payment aggregator credits the payment amount to the merchant account and the payment amount is debited from the real payment instrument 110 or the consumer account linked thereto during a settlement process, as will be readily understood by the skilled person.

In a step 530, the merchant server 112 generates a payment receipt in response to response to authorization of the instant payment transaction. In a step 532, the merchant 106 communicates the payment receipt to the consumer 104, thereby completing the instant payment transaction.

Therefore, by using the method 500 as described in various embodiments herein, the consumer 104 can provide the merchant 106 with details of a virtual payment instrument instead of a real payment instrument 110. This protects the sensitive information of the real payment instrument 110 and prevents the merchant 106 from abusing it, such as to trying to make fraudulent payment transactions with it. The merchant 106 can use the virtual payment instrument details to request for recurring payment transactions which may be a result of the consumer purchasing products and/or services from the merchant 106. For example, the recurring payment transactions may relate to recurring payments during the subscription period of a content streaming service or relate to recurring installment payments to the merchant 106. By not providing the merchant 106 with real payment instrument details, the real payment instrument 110 would not be compromised during or after the contractual period for the recurring payments. The merchant 106 has the virtual payment instrument details and would be able to request the recurring payment transactions at the respective recurring periods.

To protect the interests of the consumer 104, there is a set of payment tokens generated during generation of the virtual payment instrument and details thereof. Each payment token is uniquely associated with one of the recurring periods and is thus intended to be used only once for the respective recurring period. The validation step ensures that the instant payment transaction request matches the instant payment token. For example, the validation step checks if the instant payment transaction request is received at the correct instant recurring period. This provides assurance to the consumer 104 that the number of recurring payment transactions is limited to the number of payment tokens, mitigating the risk of the merchant 106 making fraudulent or excessive numbers of recurring payment transactions. The merchant 106 would not be able to continue to request payment transactions by using the virtual payment instrument details after the contractual period or series of recurring periods has ended, because there is no payment token associated with any period thereafter.

The validation step may optionally check if the instant payment transaction request is received at the correct common dates and/or if the payment amount for the instant payment transaction request exceeds the common maximum payment amount. This mitigates the risk of the merchant 106 making fraudulent or excessive payment amounts for the recurring payment transactions.

In some embodiments of the method 500, the token management module 102b of the payment network server 102 is further configured for performing another step of nullifying the instant payment token in response to authorization of the instant payment transaction. Nullification of the instant payment token renders it null and void for any further use after the instant payment transaction has been authorized and completed. In one embodiment, the instant payment token is nullified by modifying it such that it is considered as used, void, or invalid. For example, the token management module 102b may update the instant payment token by changing the status of the one-time usable payment token from "active" to "validated and void". A record of the nullified instant payment token may be stored on the payment network server 102 for record keeping purpose. In another embodiment, the instant payment token is nullified by deleting or expunging the instant payment token from the payment network database 122. As such, each payment token is effective once only and can be used for one payment transaction only. To result in successful validation, the payment transaction must be requested during the respective recurring period associated with the payment token.

In one embodiment, all the payment tokens are in a default "active" state and can be selected for validating. In another embodiment, all the payment tokens are in a default "inactive" state. Inactive payment tokens cannot be selected for validating. A payment token is automatically activated, i.e. changed to the "active" state, on the common date of the respective recurring period, and optionally at the common time.

Additionally, the token management module 102b may be configured for nullifying the payment tokens after the contractual period or series of recurring periods has ended. In one embodiment, the set of payment tokens associated with the series of recurring periods is nullified, regardless of whether they have been used for any payment transaction request. In another embodiment, only the unused payment tokens are nullified.

An advantage of nullifying the payment tokens after usage is to mitigate the risk of the merchant 106 requesting duplicate recurring payment transactions in the same recurring period. For example, after the merchant 106 has requested a first payment transaction in January 2018, the payment token for January 2018 would be nullified after authorization of the first payment transaction is authorized. If the merchant 106 requests a fraudulent second payment transaction in January 2018, the second payment transaction would be declined. Specifically, the second payment transaction request cannot be validated against the payment token for January 2018 because the payment token has already been nullified or even deleted/expunged.

In some instances, the merchant 106 may forget to or miss out requesting a recurring payment transaction during one or more of the recurring periods. For these missed recurring periods, the payment network server 102 does not receive any payment transaction request and does not perform any validation against the payment tokens associated with the missed recurring periods. The token management module 102b is further configured for nullifying the payment tokens associated with the missed recurring periods. As described above, nullification may involve invalidating the payment tokens and/or deleting/expunging them from the payment network database 122. The consumer 104 and merchant 106 may be informed of such nullification so that they may rearrange another payment schedule for the missed recurring periods.

In some embodiments of the method 500, the consumer 104 has signed up for a perpetual service with the merchant 106 instead of a service with a predefined term or contractual period. The merchant 106 requires the consumer 104 to continually pay for recurring payments of the perpetual service until it is terminated by the consumer 104 and/or merchant 106. The series of recurring periods for such recurring payment transactions is continual and does not have a final recurring period.

In such embodiments with a continual series of recurring periods, the token management module 102b of the payment network server 102 is further configured for generating a succeeding payment token associated with a recurring period succeeding or immediately after the instant recurring period. Specifically, subsequent to the step 526 in which the payment network server 102 receives the authorization response from the issuer server 118 and in response to authorization of the instant payment transaction, the token management module 102b determines if the set of payment tokens includes the succeeding token. If not, the token management module 102b determines generates the succeeding payment token that would allow the merchant 106 to request a succeeding payment transaction in the succeeding recurring period. Accordingly, the token management module 102b is configured for continually extending the series of recurring periods by continually adding succeeding recurring periods. The consumer 104 may give permission to the payment network server 102 to do so during the consumer registration procedure 300/400. The permission may be revoked by the consumer 104, such as after the perpetual service is terminated, thereby preventing the payment network server 102 from further extending the series of recurring periods. Upon revocation of the permission by the consumer 104, the remaining unused payment tokens are nullified. The consumer 104 may request said revocation via the merchant 106 or directly to the payment network server 102. Additionally, the token management module 102b may be configured for automatically nullifying all unused payment tokens after the perpetual service is terminated/has ended. This would mitigate the risk of the merchant 106 making another payment transaction request after termination, especially if there is one more succeeding payment token in the payment network database 122 after termination.

In some embodiments, the consumer 104 has a contractual or perpetual service with the merchant 106. Instead of terminating the service, the consumer 104 may want to pause the service and not incur expenses during the pause duration, which can span one or more of the recurring periods in the service. The consumer 104 communicates a request for pausing the service to the merchant 106 or directly to the payment network, the pausing request including details of the recurring periods affected in the pause duration. The token management module 102b is configured to nullify the payment tokens associated with the affected recurring periods, thereby preventing the merchant 106 from requesting payments in the pause duration. Optionally, the pausing request is subject to the approval of the merchant 106, such as if the merchant 106 requires the consumer 104 to have used the service for a minimum period before being eligible to pause/terminate the service.

Technical Architecture

As used herein, a server is a physical or cloud data processing system on which a server program runs. The server may be implemented in hardware or software, or a combination thereof. Some non-limiting examples of the payment network server 102, merchant server 112, aggregator server 114, acquirer server 116, and issuer server 118 include computers, laptops, mini-computers, mainframe computers, any non-transient and tangible machines that can execute a machine-readable code, cloud-based servers, distributed server networks, and a network of computer systems.

Figure 6:
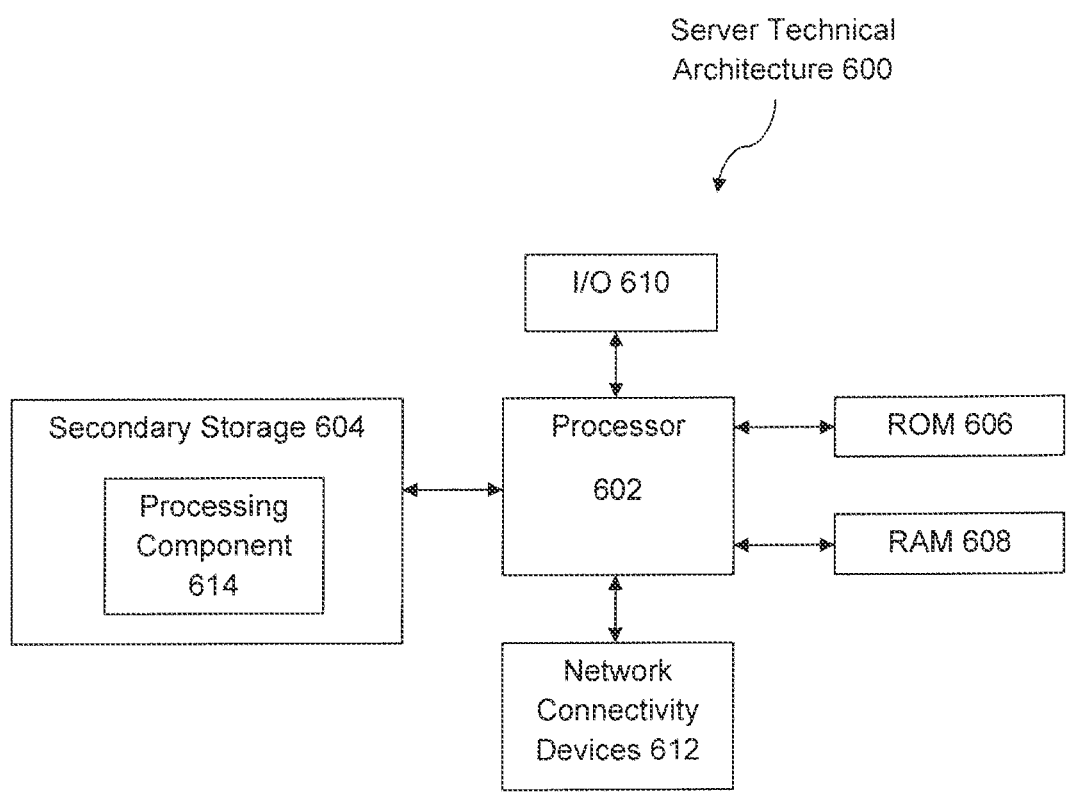
FIG. 6 is a block diagram illustration of the technical architecture of a server, in accordance with embodiments of the present disclosure.

FIG. 6 is a block diagram illustrating a technical architecture 600 of the payment network server 102. The merchant server 112, aggregator server 114, acquirer server 116, and issuer server 118 may share a similar technical architecture.

The technical architecture 600 includes a processor 602 (also referred to as a central processor unit or CPU) that is in communication with memory devices including secondary storage 604 (such as disk drives or memory cards), read-only memory (ROM) 606, and random-access memory (RAM) 608. The processor 602 may be implemented as one or more CPU chips. Various modules or components for performing various operations or steps of the methods 200/300/400/500 are configured as part of the processor 602 and such operations or steps are performed in response to non-transitory instructions operative or executed by the processor 602. The processor 602 includes suitable logic, circuitry, and/or interfaces to execute such operations or steps. Some non-limiting examples of the processor 602 include an application-specific integrated circuit (ASIC) processor, a reduced instruction set computing (RISC) processor, a complex instruction set computing (CISC) processor, a field-programmable gate array (FPGA), and the like.

The technical architecture 600 further includes input/output (I/O) devices 610, and system connectivity/network devices 612. The secondary storage 604 typically includes one or more memory cards, disk drives, tape drives, or other storage devices and is used for non-volatile storage of data and as an over-flow data storage device if RAM 608 is not large enough to hold all working data. Secondary storage 604 may be used to store programs which are loaded into RAM 608 when such programs are selected for execution.

The secondary storage 604 has a processing component 614 including non-transitory instructions operative by the processor 602 to perform various operations or steps of the methods 200/300/400/500 according to various embodiments of the present disclosure. The ROM 606 is used to store instructions and perhaps data which are read during program execution. The secondary storage 604, the ROM 606, and/or the RAM 608 may be referred to in some contexts as computer-readable storage media and/or non-transitory computer-readable media. Non-transitory computer-readable media include all computer-readable media, with the sole exception being a transitory propagating signal per se.

The I/O devices 610 may include printers, video monitors, liquid crystal displays (LCDs), plasma displays, touch screen displays, keyboards, keypads, switches, dials, mice, track balls, voice recognizers, card readers, paper tape readers, and/or other known input devices.

The system connectivity/network devices 612 may take the form of modems, modem banks, Ethernet cards, universal serial bus (USB) interface cards, serial interfaces, token ring cards, fibre distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communication (NFC), radio frequency identity (RFID), and/or other air interface protocol radio transceiver cards, and other known system connectivity/network devices. These system connectivity/network devices 612 may enable the processor 602 to communicate with the Internet or one or more intranets. With such a system/network connection, it is contemplated that the processor 602 might receive information from the network, or might output information to the network in the course of performing the operations or steps of the methods 200/300/400/500. Such information, which is often represented as a sequence of instructions to be executed using processor 602, may be received from and outputted to the network, for example, in the form of a computer data signal embodied in a carrier wave.

The processor 602 executes instructions, codes, computer programs, scripts which it accesses from hard disk, floppy disk, optical disk (these various disk-based systems may all be considered secondary storage 604), flash drive, ROM 606, RAM 608, or the system connectivity/network devices 612. While only one processor 602 is shown, multiple processors may be present. Thus, while instructions may be discussed as executed by a processor, the instructions may be executed simultaneously, serially, or otherwise executed by one or multiple processors.

The technical architecture 600 may be formed by one computer, or multiple computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the multiple computers. In an embodiment, virtualization software may be employed by the technical architecture 600 to provide the functionality of a number of servers that is not directly bound to the number of computers in the technical architecture 600. In an embodiment, the functionality disclosed above may be provided by executing the application and/or applications in a cloud computing environment. Cloud computing may include providing computing services via a system/network connection using dynamically scalable computing resources. A cloud computing environment may be established by an enterprise and/or may be hired on an as-needed basis from a third-party provider.

It is understood that by programming and/or loading executable instructions onto the technical architecture 600, at least one of the CPU 602, ROM 606, and RAM 608 are changed, transforming the technical architecture 600 in part into a specific purpose machine or apparatus having the functionality as taught by various embodiments of the present disclosure. It is fundamental to the electrical engineering and software engineering arts that functionality that can be implemented by loading executable software into a computer can be converted to a hardware implementation by known design rules.

Furthermore, various embodiments of the present disclosure may be implemented as a method, apparatus, or article of manufacture using standard programming and/or engineering techniques to produce software, firmware, hardware, or any combination thereof to control a computer to implement the disclosed embodiments. For instance, various embodiments may be implemented as a computer-readable medium embedded with a computer-executable program, which encompasses a computer program accessible from any computer-readable storage device or storage media. For example, computer-readable media can include but are not limited to magnetic storage devices (e.g. hard disk, floppy disk, or magnetic strips), optical discs (e.g. compact disc (CD), digital versatile disc (DVD), or Blu-ray disc), smart cards, flash memory devices (e.g. card, stick, or key drive), and solid state drives/memory devices.

In the foregoing detailed description, embodiments of the present disclosure in relation to an electronic system and computerized method for processing recurring payment transactions are described with reference to the provided figures. The description of the various embodiments herein is not intended to call out or be limited only to specific or particular representations of the present disclosure, but merely to illustrate non-limiting examples of the present disclosure. The present disclosure serves to address at least one of the mentioned problems and issues associated with the prior art. Although only some embodiments of the present disclosure are disclosed herein, it will be apparent to a person having ordinary skill in the art in view of this disclosure that a variety of changes and/or modifications can be made to the disclosed embodiments without departing from the scope of the present disclosure. Therefore, the scope of the disclosure as well as the scope of the following claims is not limited to embodiments described herein.

The invention claimed is:

1. A payment network server that processes a set of recurring payment transactions over a series of recurring periods, the payment network server comprising:
   a database;
   a memory device having computer-executable instructions stored thereon;
   a consumer registration module executing the computer-executable instructions, which cause the consumer registration module to:
      receive, from an electronic device of a consumer, details of a real payment instrument of the consumer and details of the set of recurring payment transactions;
      generate a virtual payment instrument and details thereof based on the real payment instrument details;
      link the details of the real payment instrument with the virtual payment instrument details; and
      communicate the virtual payment instrument details to the consumer electronic device; and
   a token management module executing the computer-executable instructions, which cause the token management module to:
      generate a set of payment tokens respectively for the set of recurring payment transactions based on the details of the set of recurring payment transactions, the set of payment tokens being commonly associated with the virtual payment instrument and each payment token being uniquely associated with one of the recurring periods,
   wherein requests for the recurring payment transactions by the merchant are validated against the set of payment tokens for processing the recurring payment transactions,
   the set of payment tokens being associated with a common maximum payment amount to validate the requests for the recurring payment transactions, each payment token of the set of payment tokens being encoded with a sequence of values, wherein a portion of the encoded values include the common maximum payment amount.

2. The payment network server according to claim 1, each payment token of the set of payment tokens being encoded in one or the following forms: a Quick Response (QR) code, a barcode, an EZcode, a high capacity color barcode, a ShotCode, a MaxiCode, a GTIN12 code, a GTIN-13 code, or an Aztec code.

3. The payment network server according to claim 1, the computer-executable instructions further causing the consumer registration module to transmit a request for authentication of the real payment instrument to an issuer server operated by an issuer institution associated with the real payment instrument, the authentication request including the details of the real payment instrument.

4. The payment network server according to claim 1, the details of the set of recurring payment transactions including the following:
   a start date for determining a first recurring period in the series of recurring periods;
   an end date for determining a final recurring period in the series of recurring periods; and
   a recurring period duration for determining a number of discrete recurring periods in the series of recurring periods.

5. A payment network server that processes a set of recurring payment transactions over a series of recurring periods, the payment network server comprising:
   a database;
   a memory device having computer-executable instructions stored thereon;
   a consumer registration module executing the computer-executable instructions, which cause the consumer registration module to:
      receive, from an electronic device of a consumer, details of a real payment instrument of the consumer and details of the set of recurring payment transactions;
      generate a virtual payment instrument and details thereof based on the real payment instrument details;
      link the details of the real payment instrument with the virtual payment instrument details; and
      communicate the virtual payment instrument details to the consumer electronic device; and
   a token management module executing the computer-executable instructions, which cause the token management module to:
      generate a set of payment tokens respectively for the set of recurring payment transactions based on the details of the set of recurring payment transactions, the set of payment tokens being commonly associated with the virtual payment instrument and each payment token being uniquely associated with one of the recurring periods,
   wherein requests for the recurring payment transactions by the merchant are validated against the set of payment tokens for processing the recurring payment transactions,
   the set of payment tokens being associated with a set of common dates in the series of recurring periods to validate the requests for the recurring payment transactions,
   said set of common dates includes one of the following: a discrete date or a range of dates, each payment token of the set of payment tokens being encoded with a sequence of values, wherein a portion of the encoded values include the set of common dates.

6. The payment network server according to claim 5, each payment token of the set of payment tokens being encoded in one or the following forms: a Quick Response (QR) code, a barcode, an EZcode, a high capacity color barcode, a ShotCode, a MaxiCode, a GTIN12 code, a GTIN-13 code, or an Aztec code.

7. The payment network server according to claim 5, the computer-executable instructions further causing the consumer registration module to transmit a request for authentication of the real payment instrument to an issuer server operated by an issuer institution associated with the real payment instrument, the authentication request including the details of the real payment instrument.

8. The payment network server according to claim 5, the details of the set of recurring payment transactions including the following:
   a start date for determining a first recurring period in the series of recurring periods;
   an end date for determining a final recurring period in the series of recurring periods; and
   a recurring period duration for determining a number of discrete recurring periods in the series of recurring periods.

9. A payment network server that processes a set of recurring payment transactions over a series of recurring periods, the payment network server comprising:
   a database;
   a memory device having computer-executable instructions stored thereon;
   a consumer registration module executing the computer-executable instructions, which cause the consumer registration module to:
      receive, from an electronic device of a consumer, details of a real payment instrument of the consumer and details of the set of recurring payment transactions;
      generate a virtual payment instrument and details thereof based on the real payment instrument details;
      link the details of the real payment instrument with the virtual payment instrument details; and
      communicate the virtual payment instrument details to the consumer electronic device; and
   a token management module executing the computer-executable instructions, which cause the token management module to:
      generate a set of payment tokens respectively for the set of recurring payment transactions based on the details of the set of recurring payment transactions, the set of payment tokens being commonly associated with the virtual payment instrument and each payment token being uniquely associated with one of the recurring periods,
   wherein requests for the recurring payment transactions by the merchant are validated against the set of payment tokens for processing the recurring payment transactions,
   the virtual payment instrument details comprising one or more of the following: a virtual payment instrument identifier; an expiry date; and a security code,
   each payment token of the set of payment tokens being encoded with a sequence of values, wherein a portion of the encoded values includes a portion of the virtual payment instrument identifier, which is used to match the respective payment token to the virtual payment instrument.

10. The payment network server according to claim 9, each payment token of the set of payment tokens being encoded in one or the following forms: a Quick Response (QR) code, a barcode, an EZcode, a high capacity color barcode, a ShotCode, a MaxiCode, a GTIN12 code, a GTIN-13 code, or an Aztec code.

11. The payment network server according to claim 9, the computer-executable instructions further causing the consumer registration module to transmit a request for authentication of the real payment instrument to an issuer server operated by an issuer institution associated with the real payment instrument, the authentication request including the details of the real payment instrument.

12. The payment network server according to claim 9, the details of the set of recurring payment transactions including the following:
   a start date for determining a first recurring period in the series of recurring periods;
   an end date for determining a final recurring period in the series of recurring periods; and
   a recurring period duration for determining a number of discrete recurring periods in the series of recurring periods.

13. A payment network server that processes a set of recurring payment transactions over a series of recurring periods, the payment network server comprising:
   a database;
   a memory device having computer-executable instructions stored thereon;
   a consumer registration module executing the computer-executable instructions, which cause the consumer registration module to:
      receive, from an electronic device of a consumer, details of a real payment instrument of the consumer and details of the set of recurring payment transactions;
      generate a virtual payment instrument and details thereof based on the real payment instrument details;
      link the details of the real payment instrument with the virtual payment instrument details; and
      communicate the virtual payment instrument details to the consumer electronic device; and
   a token management module executing the computer-executable instructions, which cause the token management module to:
      generate a set of payment tokens respectively for the set of recurring payment transactions based on the details of the set of recurring payment transactions, the set of payment tokens being commonly associated with the virtual payment instrument and each payment token being uniquely associated with one of the recurring periods,
   wherein requests for the recurring payment transactions by the merchant are validated against the set of payment tokens for processing the recurring payment transactions,
   the details of the real payment instrument comprising one or more of the following: an issuer institution, a unique identifier, an expiry date, a security code, and an authentication code,
   each payment token of the set of payment tokens being encoded with a sequence of values, wherein a portion of the encoded values includes a portion of the unique identifier.

14. The payment network server according to claim 13, each payment token of the set of payment tokens being encoded in one or the following forms: a Quick Response (QR) code, a barcode, an EZcode, a high capacity color barcode, a ShotCode, a MaxiCode, a GTIN12 code, a GTIN-13 code, or an Aztec code.

15. The payment network server according to claim 13, the computer-executable instructions further causing the consumer registration module to transmit a request for authentication of the real payment instrument to an issuer server operated by an issuer institution associated with the real payment instrument, the authentication request including the details of the real payment instrument.

16. The payment network server according to claim 13, the details of the set of recurring payment transactions including the following:
   a start date for determining a first recurring period in the series of recurring periods;
   an end date for determining a final recurring period in the series of recurring periods; and
   a recurring period duration for determining a number of discrete recurring periods in the series of recurring periods.

17. A payment network server that processes a set of recurring payment transactions over a series of recurring periods, the payment network server comprising:
   a database;
   a memory device having computer-executable instructions stored thereon;
   a consumer registration module executing the computer-executable instructions, which cause the consumer registration module to:
      receive, from an electronic device of a consumer, details of a real payment instrument of the consumer and details of the set of recurring payment transactions;
      generate a virtual payment instrument and details thereof based on the real payment instrument details;
      link the details of the real payment instrument with the virtual payment instrument details; and
      communicate the virtual payment instrument details to the consumer electronic device; and
   a token management module executing the computer-executable instructions, which cause the token management module to:
      generate a set of payment tokens respectively for the set of recurring payment transactions based on the details of the set of recurring payment transactions, the set of payment tokens being commonly associated with the virtual payment instrument and each payment token being uniquely associated with one of the recurring periods,
   wherein requests for the recurring payment transactions by the merchant are validated against the set of payment tokens for processing the recurring payment transactions,
   the virtual payment instrument details comprising a virtual payment instrument identifier,
   the details of the real payment instrument comprising a unique identifier,
   each payment token of the set of payment tokens being encoded with a sequence of values, wherein a first portion of the encoded values includes a portion of the unique identifier, and a second portion of the encoded values includes a portion of the virtual payment instrument identifier.

18. The payment network server according to claim 17, each payment token of the set of payment tokens being encoded in one or the following forms: a Quick Response (QR) code, a barcode, an EZcode, a high capacity color barcode, a ShotCode, a MaxiCode, a GTIN12 code, a GTIN-13 code, or an Aztec code.

19. The payment network server according to claim 17, the computer-executable instructions further causing the consumer registration module to transmit a request for authentication of the real payment instrument to an issuer server operated by an issuer institution associated with the real payment instrument, the authentication request including the details of the real payment instrument.

20. The payment network server according to claim 17, the details of the set of recurring payment transactions including the following:
   a start date for determining a first recurring period in the series of recurring periods;
   an end date for determining a final recurring period in the series of recurring periods; and
   a recurring period duration for determining a number of discrete recurring periods in the series of recurring periods.

\* \* \* \* \*